US008478357B1

(12) United States Patent
Harrington

(10) Patent No.: US 8,478,357 B1
(45) Date of Patent: Jul. 2, 2013

(54) REMOVABLE ADAPTER WITH SPEAKER AND MICROPHONE FOR A WIRELESS COMMUNICATIONS DEVICE

(76) Inventor: Adrienne L. Harrington, Greenville, NC (US)

( * ) Notice: Subject to any disclaimer, the term of this patent is extended or adjusted under 35 U.S.C. 154(b) by 0 days.

(21) Appl. No.: 13/560,045

(22) Filed: Jul. 27, 2012

(51) Int. Cl.
*H04M 1/00* (2006.01)

(52) U.S. Cl.
USPC ............... 455/569.1; 455/569.2; 455/575.1; 455/575.6; 455/575.8; 455/575.9

(58) Field of Classification Search
USPC .................... 455/566, 569.1, 573–575.8
See application file for complete search history.

(56) References Cited

U.S. PATENT DOCUMENTS

| 5,822,546 | A | 10/1998 | George |
| 6,138,041 | A * | 10/2000 | Yahia ........................ 455/569.2 |
| 6,445,577 | B1 | 9/2002 | Madsen et al. |
| 6,516,202 | B1 | 2/2003 | Hawkins et al. |
| 6,952,617 | B1 * | 10/2005 | Kumar ............................. 700/1 |
| 7,149,543 | B2 | 12/2006 | Kumar |
| 7,400,910 | B2 | 7/2008 | Matsumoto et al. |
| 7,400,917 | B2 | 7/2008 | Wood et al. |
| 7,638,969 | B2 | 12/2009 | Woud |
| 7,648,027 | B2 | 1/2010 | Lin et al. |
| 7,660,601 | B2 | 2/2010 | Janik et al. |
| 7,803,016 | B2 | 9/2010 | Neu et al. |
| 2003/0165237 | A1 | 9/2003 | Farr et al. |
| 2005/0090301 | A1 * | 4/2005 | Lange et al. ................ 455/575.8 |
| 2006/0057973 | A1 * | 3/2006 | Wikel et al. .................. 455/90.3 |
| 2006/0058081 | A1 | 3/2006 | Reichenbach |
| 2006/0293098 | A1 | 12/2006 | Lin |
| 2008/0108387 | A1 | 5/2008 | Entner |
| 2008/0132289 | A1 | 6/2008 | Wood et al. |
| 2008/0300013 | A1 | 12/2008 | Raines et al. |
| 2008/0300014 | A1 | 12/2008 | Raines et al. |
| 2008/0316683 | A1 | 12/2008 | Tan et al. |
| 2009/0114556 | A1 | 5/2009 | Tai et al. |
| 2009/0160399 | A1 | 6/2009 | Woud |
| 2009/0160400 | A1 | 6/2009 | Woud |
| 2009/0312058 | A9 | 12/2009 | Wood et al. |
| 2010/0035667 | A1 * | 2/2010 | Bury .......................... 455/575.1 |
| 2011/0090626 | A1 | 4/2011 | Hoellwarth et al. |
| 2012/0172090 | A1 * | 7/2012 | Capps .......................... 455/566 |
| 2013/0052956 | A1 * | 2/2013 | McKell ........................ 455/41.2 |

FOREIGN PATENT DOCUMENTS

| CN | 2779753 Y | 5/2006 |
| JP | 2008301056 A | 12/2008 |

* cited by examiner

*Primary Examiner* — Dai A Phuong

(74) *Attorney, Agent, or Firm* — Coats & Bennett, PLLC

(57) ABSTRACT

An adapter for a wireless communications device has a speaker embedded in an upper end portion, a microphone embedded in a lower end portion, and a male electrical post connector mounted in the lower end portion. The post connector is electrically connected to the speaker and microphone. The post connector has an exposed tip and extends from the lower end portion generally toward the upper end portion. A theoretical plane bisects the base into left and right lateral portions and the microphone and connector are disposed on opposing sides of the theoretical plane. The adapter is configured such that when physically mounted to the wireless communications device, and the post connector is mated to the external communications port, the microphone and speaker are electrically connected to the wireless communications device. The combination may be used for VOIP communications.

8 Claims, 5 Drawing Sheets

REMOVABLE ADAPTER WITH SPEAKER AND MICROPHONE FOR A WIRELESS COMMUNICATIONS DEVICE

BACKGROUND

Numerous portable wireless communications devices exist on the market today. For example, portable cellular telephones have become almost ubiquitous. Many of the wireless communications devices rely primarily on the cellular telephone infrastructure in order to communicate with other wireless communications devices. Such is the case with basic cellular telephones. More sophisticated devices, known as smartphones, are frequently designed to also work with other wireless networks, such as "Wi-Fi" networks. However, smartphones also require a subscription to a cellular service provider, and the costs of such subscriptions have proven quite burdensome for many situations, particularly families with several children having cellular telephones.

Other portable electronic devices have been developed, such as the portable MP3 players. These devices have also evolved, and more sophisticated ones currently also allow video viewing and internet access through Wi-Fi connections, and therefore may be considered as wireless communications devices. Such devices are typically configured with an earphone jack for connecting with a corresponding plug of a small earpiece speaker ("earphone").

Separately, a number of web-based "telephone" programs have been developed, such as the SKYPE brand program. These programs allow for a web-enabled device to place a telephone call without being initially connected to the telephone (including cellular telephone) network. That is, these programs allow for the local voice data signals for the device to be carried on a non-cellular network, e.g., the internet. For example, a user having a desktop computer connected only to the internet (by cables and/or Wi-Fi) to place a "call" to a phone number and thereafter have a conversation, and sometimes a video conference, with the party on the other end, even though the desktop computer is connected to the telecommunications network only through the internet connection. However, having to use a non-portable desktop computer clearly limits the utility of such an approach, as portability is highly desirable. Using a laptop computer is a slightly better alternative, but still highly cumbersome.

What is desired is the ability to have a phone-like experience, with call-out and optionally call-in ability, using a wireless communications system other than a cellular system, so as to be able to avoid the cellular phone subscription charges. One possible avenue is to use a non-cellular Wi-Fi enabled portable wireless communications device, such as the IPOD TOUCH brand product from Apple, Inc. However, such devices do not have microphones, and more importantly do not have a microphone and speaker separated from each other so that the microphone may be placed proximate a user's mouth and the speaker proximate the user's ear. As such, it is not possible, using the prior art, to use such devices and have a communications experience like using a phone conventional handset with its concomitant privacy. Accordingly, there remains a need for alternative approaches to wireless communications devices.

SUMMARY

The present invention provides an adapter for a wireless communications device having an external communications port. The adapter comprises a main unit with a generally planar base and having an upper end portion and a lower end portion longitudinally separated by an intermediate portion. The upper end portion has a first hook-shaped flange and the lower end portion has a second hook-shaped flange with the flanges each extending forward from the base. The adapter has a cavity bounded by the base and the flanges. The adapter also has a speaker embedded in the upper end portion, a microphone embedded in the lower end portion, and a male electrical post connector mounted in the lower end portion. The male electrical post connector is electrically connected to the speaker and the microphone and has an exposed tip. The post connector extends from the lower end portion generally toward the upper end portion such that the tip is closest to the upper end portion. A theoretical plane bisects the base into left and right lateral portions, and the microphone and the connector are disposed on opposing sides of the theoretical plane, in spaced relation thereto. The adapter is configured such that when physically mounted to the wireless communications device by the flanges, and the post connector is mated to the external communications port, the microphone and speaker are electrically connected to the wireless communications device.

The adapter may advantageously be flexible. The lower portion of the adapter may include a third hook-shaped flange, with the microphone embedded in the second flange and the post connector mounted to the third flange. The second and third hook-shaped flanges of the lower end portion may be spaced sufficiently far apart to allow for an opening for a docking connector to access the wireless communications device therebetween. Each of the flanges of the adapter may comprise a lip disposed generally parallel to the base in spaced relation thereto. The intermediate portion of the adapter may be laterally narrower than the upper and lower end portions. The post connector of the adapter may be electrically connected to the speaker and the microphone via suitable wires embedded in the main unit. The main unit of the adapter may comprise one or more ports configured to expose the embedded microphone and/or speaker. The post connector of the adapter may comprise at least three electrically distinct electrical contact zones.

DETAILED DESCRIPTION

In one embodiment, the present invention provides a VOIP adapter, generally indicated at 30, for a portable wireless communications device 10. For illustrative purposes, a wireless communications device like the IPOD TOUCH brand product from Apple, Inc. will be used in the description below, but it should be understood that the invention is applicable to other wireless communications devices as well.

Figure 1:
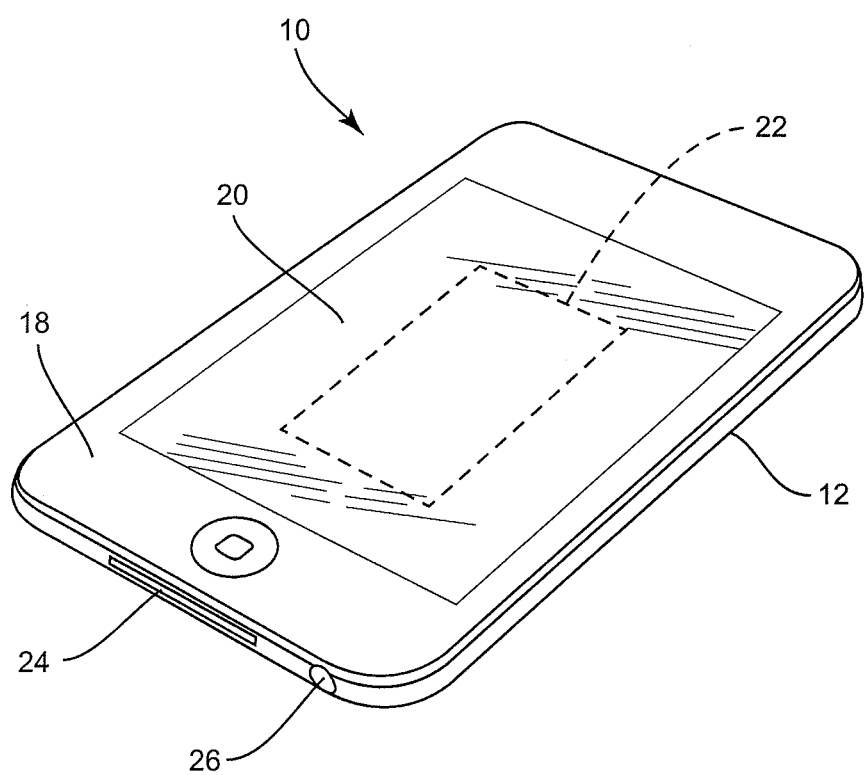
FIG. 1 shows an illustrative wireless communication device

The portable wireless communications device 10 includes a housing 12 enclosing electronics 22 therein. See FIGS. 1-2. The housing includes an upper edge, a lower edge, and a front face 18 having a display 20 thereon. The electronics 22 of the wireless communications device 10 include suitable circuitry for storing and playing audio and, advantageously, video. The electronics also include suitable circuitry for bi-directional wireless communications over a network other than a cellular telephone network, such as a Wi-Fi network connected to the internet. The display 20 is controlled by the electronics 22, and typically also functions as a user control interface. The front face 18 may also contain user input controls of the kind known in the art.

The wireless communications device 10 also includes a docking port 24 and an electronic communications port 26. The electronic communications port 26 is configured to interface with a male electrical post connector 64, such as a stereo plug (i.e., Tip/Ring/Sleeve (TRS) connector, earphone jack, etc.), known in the art. The electronic communications port 26 may be configured to receive male electrical post connectors with multiple electrically distinct electrical contact zones (e.g., two, three, four, or more). The electronic communications port 26 is further configured to output audio signals to an attached earphone or speaker. The port 26 is advantageously multi-functional in that it is also configured to receive audio inputs. The port 26 may be located on the lower edge of the wireless communications device 10, although other locations are also possible. Additional details of the wireless communications device's construction and operation are not detailed further herein because they are known in the art and are not important for understanding the present invention.

Figure 2:
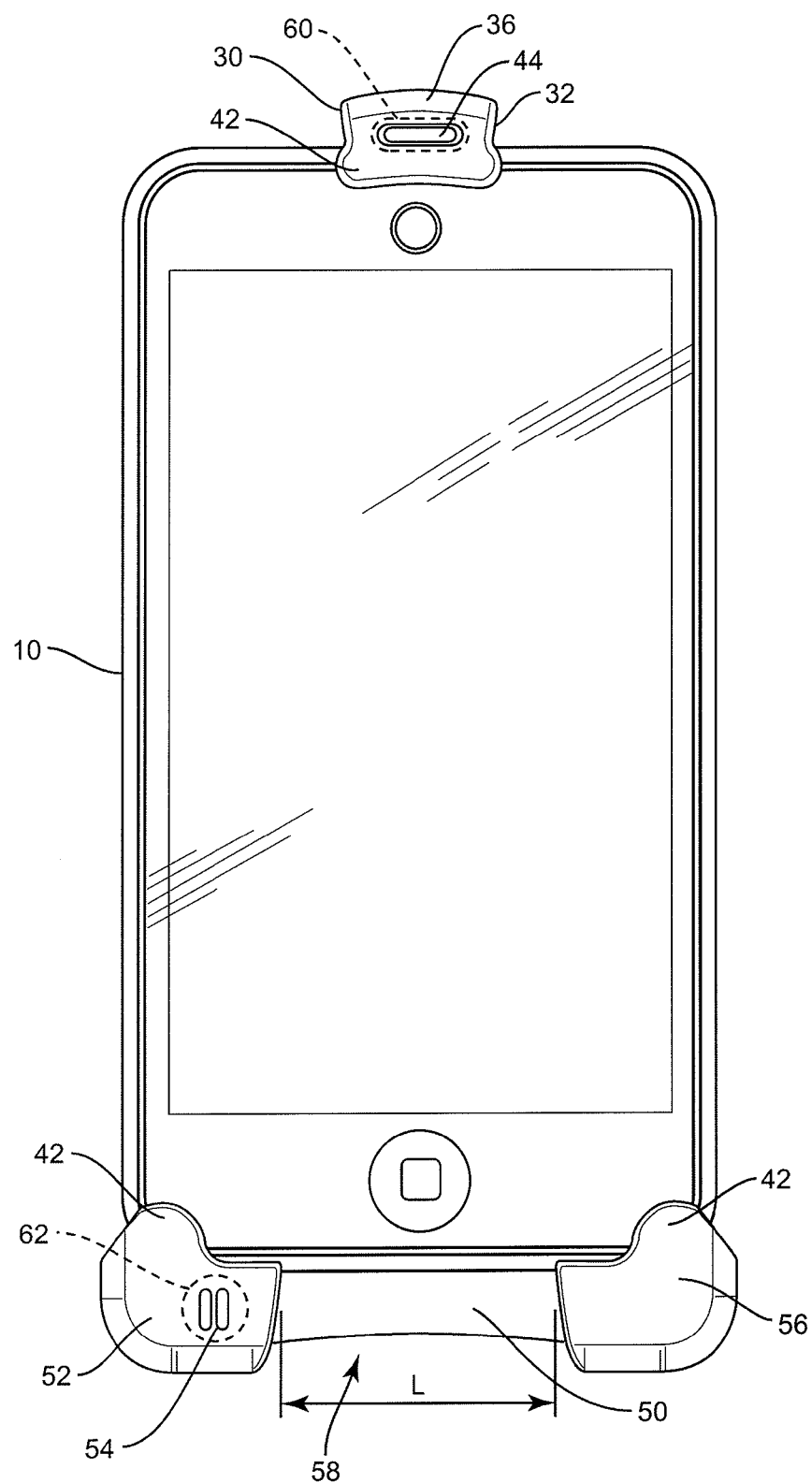
FIG. 2 shows an adapter according to one embodiment of the invention mounted to the wireless communication device of FIG. 1.
Figure 3:
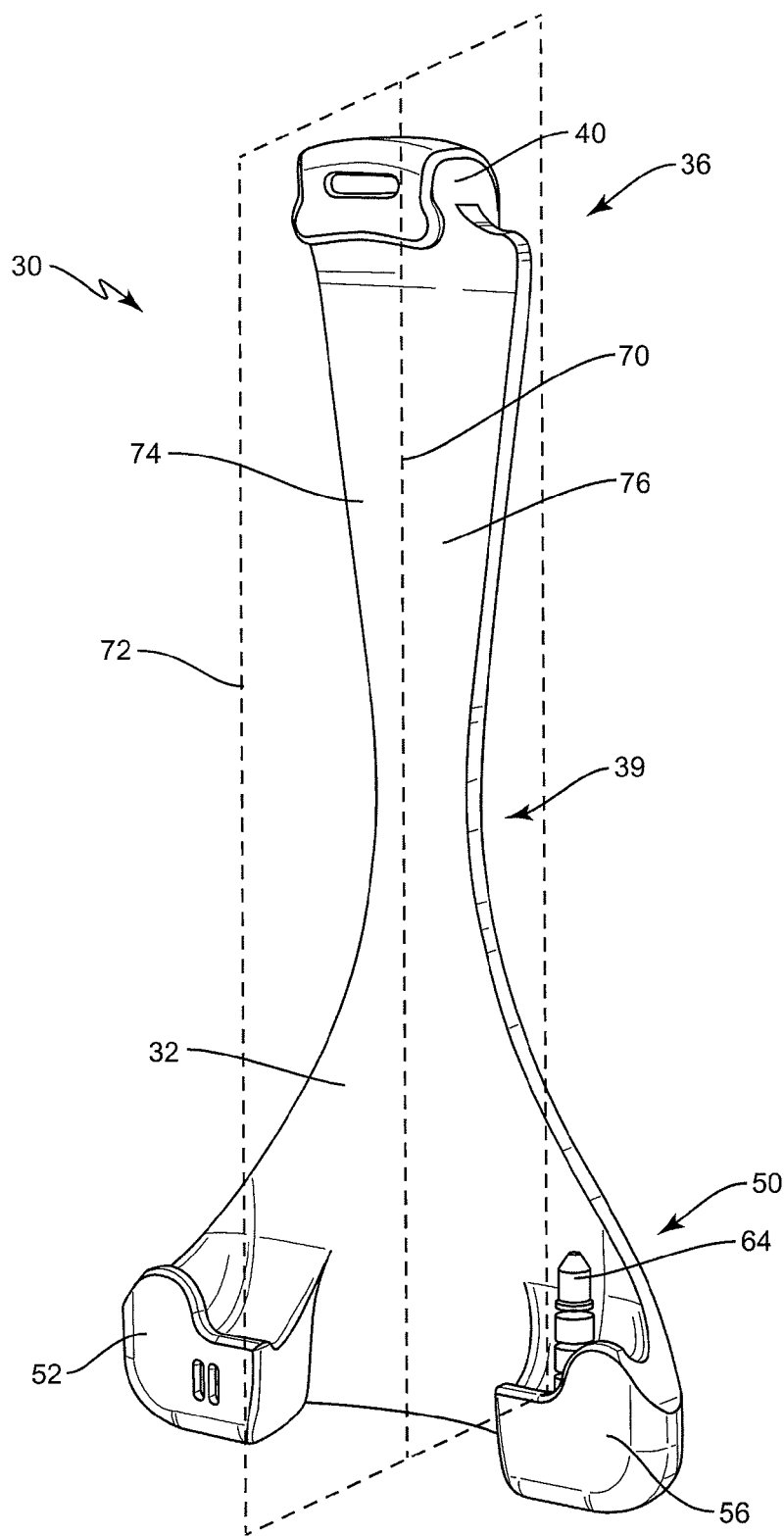
FIG. 3 shows a perspective view of the adapter of FIG. 2.
Figure 4:
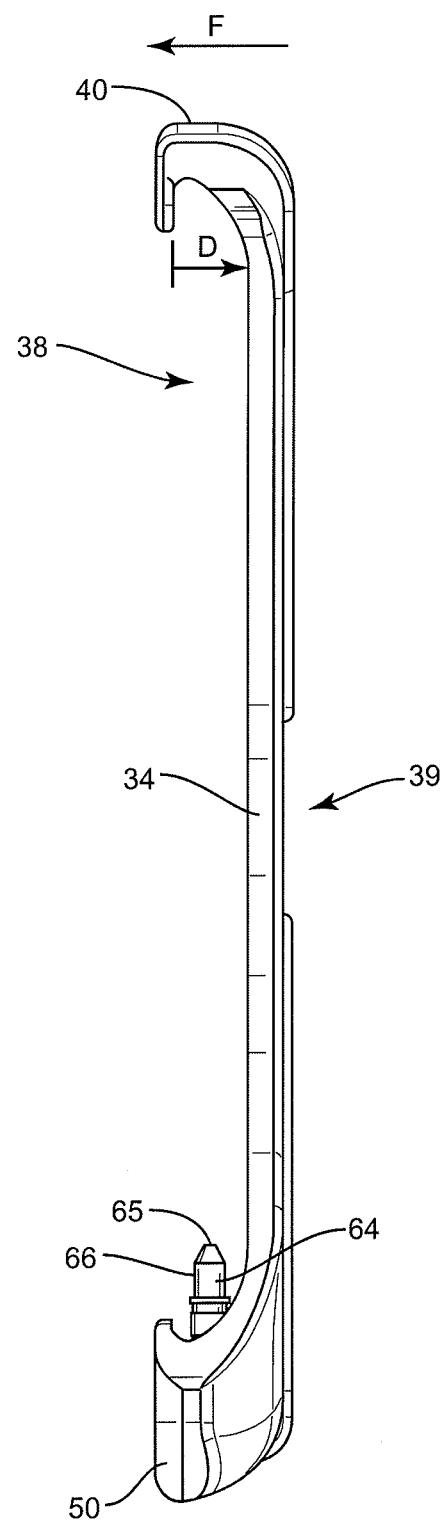
FIG. 4 shows a side view of the adapter of FIG. 2.

The VOIP adapter 30 is removably mountable to the housing 12 of the wireless communications device 10, as shown in FIG. 2. The adapter 30, shown in greater detail in FIGS. 3-5, includes a main unit 32 comprising a generally planar base 34 extending along a longitudinal axis 70. The base 34 includes an upper end portion 36, a lower end portion 50, and an intermediate portion 39. The upper end portion 36 includes a first hook-shaped flange 40 and the lower end portion 50 includes a second hook-shaped flange 52, each flange extending a distance D in a forward direction F from the base 34. Each flange is configured to substantially conform to the upper and lower edges of the wireless communications device 10 to facilitate mounting the adapter 30 to the wireless communications device 10 via gripping by the flanges. Thus, the flanges and the base 34 define a cavity 38 configured to receive the wireless communications device 10 therein.

The adapter 30 further includes a speaker 60 embedded in the upper end portion 36 of the base 34 and advantageously oriented forward. In some embodiments, the speaker 60 is advantageously embedded in the first hook-shaped flange 40 of the upper end portion 36. Similarly, a microphone 62 is embedded in the lower end portion 50 of the base 34 and advantageously oriented forward. Thus, the speaker 60 and microphone 62 are disposed toward opposite ends of the cavity 38. In some embodiments, the microphone 62 is similarly embedded in the second hook-shaped flange 52 of the lower end portion 50. The upper and/or lower end portions 36, 50 (advantageously the flanges 40, 52 thereof) may also have respective ports 44, 54 to provide a path for sound from outside of the adapter 30 to the respective speaker 60 or microphone 62 embedded therein.

The adapter 30 also includes a male electrical post connector 64 mounted in the lower end portion 50 of the base 34. The post connector 64 is generally cylindrical in shape and includes a tip 65 and multiple electrically distinct electrical contact zones 66 (e.g., two, three, four, or more), for making electrical contact with a corresponding female electrical port, such as the external communication port 26 on the wireless communications device 10. These distinct electrical contact zones 66 are disposed in series along the length of the post connector 64. Both the tip 65 and the contact zones 66 of the post connector 64 are advantageously exposed relative to the main unit 32. The post connector 64 is mounted to the lower end portion 50 of the main unit 32 such that it extends toward the upper end portion 36 with the exposed tip 65 being closest to the upper end portion 36 relative to other parts of the post connector 64. In some embodiments, the post connector 64 is mounted to a third flange 56 disposed in the lower end portion 50 of the base 34, as discussed further below.

In some embodiments, the adapter 30 may be laterally wider in the lower end portion 50 of the base 34 relative to the upper end portion 36. In certain other embodiments, the intermediate portion 39 of the base 34 may be laterally narrower than the upper end portion 36 and/or the lower end portion 50. Such configurations may advantageously allow for the lower end portion 50 to accommodate the microphone 62 and the post connector 64 without unnecessarily utilizing additional materials for the base 34.

Figure 5:
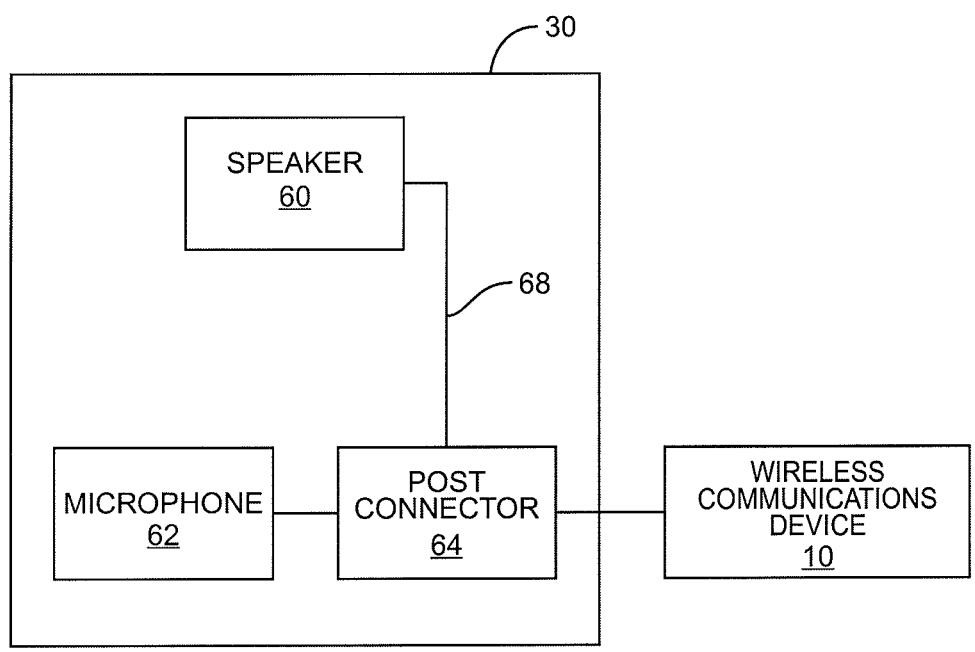
FIG. 5 shows a functional block diagram of the electrical components of the adapter of FIG. 2.

Referring to FIG. 5, the post connector 64 is electrically connected to the speaker 60 and the microphone 62 via wires 68. This enables signals to be exchanged between the microphone 62 and/or speaker 60 and the wireless communications device 10 via the post connector 64. In some embodiments, the wires 68 may be embedded in the main unit 32. In certain other embodiments, the post connector 64 may connect to the microphone 62 and/or speaker 60 via a printed circuit board (PCB) and wires 68. The PCB may be similarly embedded in the main unit 32, such as in intermediate section 39.

In some embodiments, the microphone 62 and the post connector 64 are disposed on opposing sides of, and in spaced relation to, a theoretical plane 72 that bisects the base 34 into left and right lateral portions 74, 76. For example, where the lower end portion 50 includes a second flange 52 and a third flange 56, the flanges 52, 56 may be disposed on opposing sides of the theoretical plane 72. The microphone 62 may be embedded in the second flange 52 and the post connector 64 may be mounted to the third flange 56. The second flange 52 and third flange 56 may be separated by a distance L, so that an open space 58 is defined therebetween. The distance L may be sufficient to allow a docking connector configured to interface with the docking port 24 of the wireless communications device 10 to pass therebetween when the adapter 30 is mounted to the wireless communications device 10.

The adapter 30 is mountable to the wireless communications device 10 as shown in FIG. 2. When the wireless communications device 10 is disposed in the cavity 38, the post connector 64 is disposed so as to mate with the external communications port 26 of the wireless communications device 10 and the flanges 40, 52, 56 help mount the adapter 30 to the wireless communications device 10. The flanges 40, 52, 56 are advantageously configured so that they extend longitudinally beyond the upper and lower edges, respectively, of the wireless communications device 10. In this way, the speaker 60 and microphone 62 embedded in the flanges 36, 50 remain facing forward without being obstructed by the installed wireless communications device 10. In some embodiments, each flange 40, 52, 56 may further include a lip 42 disposed generally parallel to the base 34 and spaced distance D thereto. The lips 42 are configured to aid in securing the adapter 30 to the wireless communications device 10 by extending over the front 18 of the device 10 without obstructing a view of the display 20.

When the adapter 30 is mounted to the wireless communications device 10, and the post connector 64 is mated to the external communications port 26, the microphone 62 and speaker 60 are operatively connected to the electronics 22 in the wireless communications device 10. Thereafter, when an appropriate "phone" application is launched on the wireless communications device 10, such as SKYPE, the application may access the inputs from the microphone 62 and output via the speaker 60. The positioning of the speaker 60 and microphone 62 above and below the display 20 allow enough spacing between the two that the wireless communications device 10 may be held to the user's head and used like a conventional telephone handset. As discussed above, at the wireless communication device 10 end of the call, the local voice signals flow between the wireless communications device 10 and a remote party (at the other end of the "call") via Wi-Fi or similar network that is not the cellular telephone/data network. Accordingly, the user can use the combined device 10 as something similar to a portable cellular telephone without having a cellular telephone subscription.

In some embodiments, the adapter 30 may be formed in whole or in part of a compliant elastic material, such as silicone, rubber, or the like. Other non-rigid materials are also possible, such as leather and the like. Such flexible materials may allow the adapter 30 to be more easily mounted to, and/or removed from, the wireless communications device 10. In other embodiments, the adapter 30 may be formed by a combination of rigid material, such as metal, ABS or polycarbonate plastics, or the like, and compliant elastic materials like those mentioned above. For example, the adapter 30 may be formed with a rigid inner core surrounded on one or more sides by a flexible compliant material. This compliant material may advantageously enclose the speaker 60, microphone 62, wires 38 and other components as described above to protect these components. This combination may advantageously allow for the adapter 30 to both mount and dismount with relative ease while at the same time serving a protective function for the device 10 by absorbing mechanical shocks to the wireless communications device 10. Alternatively, the adapter 30 may include two or more substantially rigid materials that mount to the wireless communications device 10 by sliding over the housing and operatively attaching together (e.g. snap together). However, preferred embodiments of the adapter 30 are configured such that the various parts of the adapter 30 are inseparable.

The disclosure of U.S. Patent Application Publication No. 2012/0172090 is incorporated herein by reference.

The present invention may, of course, be carried out in other specific ways than those herein set forth without departing from the scope of the invention. The present embodiments are, therefore, to be considered in all respects as illustrative and not restrictive, and all changes coming within the meaning and equivalency range of the appended claims are intended to be embraced therein.

What is claimed is:

1. An adapter for a wireless communications device having an external communications port, the adapter comprising:
a main unit comprising a generally planar base and having an upper end portion and a lower end portion longitudinally separated by an intermediate portion;
the upper end portion having a first hook-shaped flange and the lower end portion having a second hook-shaped flange, the flanges each extending forward from the base;
a cavity bounded by the base and the flanges;
a speaker embedded in the upper end portion;
a microphone embedded in the lower end portion;
a male electrical post connector mounted in the lower end portion and electrically connected to the speaker and the microphone;
the post connector having an exposed tip;
wherein the post connector extends from the lower end portion generally toward the upper end portion such that the tip is closer to the upper end portion than a remainder of the post connector;
wherein a theoretical plane bisects the base into left and right lateral portions; wherein the microphone and the connector are disposed on opposing sides of the theoretical plane, in spaced relation thereto;
wherein the adapter is configured such that when physically mounted to the wireless communications device by the flanges, and the post connector is mated to the external communications port, the microphone and speaker are electrically connected to the wireless communications device;
wherein the lower portion comprises a third hook-shaped flange;
wherein the microphone is embedded in the second flange;
wherein the post connector is mounted to the third flange;
wherein the second and third hook-shaped flanges of the lower end portion are spaced apart to form an opening for a docking connector to access the wireless communications device.

2. The adapter of claim 1 wherein each flange comprises a lip disposed generally parallel to the base in spaced relation thereto.

3. The adapter of claim 1 wherein the main unit is flexible.

4. The adapter of claim 1 wherein the intermediate portion is laterally narrower than the upper and lower end portions.

5. The adapter of claim 1 wherein the post connector is electrically connected to the speaker and the microphone via wires embedded in the main unit.

6. The adapter of claim 1 wherein the lower end portion comprises a port leading to the embedded microphone.

7. The adapter of claim 1 wherein the upper end portion comprises a port leading to the embedded speaker.

8. The adapter of claim 1 wherein the post connector comprises at least three electrically distinct electrical contact zones.

* * * * *